(12) United States Patent
Deurloo et al.

(10) Patent No.: US 6,972,529 B2
(45) Date of Patent: Dec. 6, 2005

(54) SWITCH MODE POWER SUPPLY FOR A GAS DISCHARGE LAMP

(75) Inventors: Oscar Jan Deurloo, Arlington Heights, IL (US); Dolf Henricus Jozef Van Casteren, Eindhoven (NL); Markus Krijzer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/483,856

(22) PCT Filed: Jun. 5, 2002

(86) PCT No.: PCT/IB02/02102

§ 371 (c)(1),
(2), (4) Date: Jan. 14, 2004

(87) PCT Pub. No.: WO03/009648

PCT Pub. Date: Jan. 30, 2003

(65) Prior Publication Data
US 2005/0073267 A1 Apr. 7, 2005

(30) Foreign Application Priority Data
Jul. 19, 2001 (EP) .................................. 01202764

(51) Int. Cl.[7] ............................ H05B 37/02; F23Q 7/00
(52) U.S. Cl. ........................ 315/209 SC; 315/209 CD; 315/209 M; 361/264; 361/247
(58) Field of Search ................. 315/209 SC, 209 CD, 315/209 M, 223, 219, 279; 361/264, 265, 361/247

(56) References Cited

U.S. PATENT DOCUMENTS 4,447,759 A * 5/1984 Moerkens et al. ............ 315/60
6,204,611 B1 * 3/2001 Bouwman et al. .......... 315/290
6,242,867 B1 * 6/2001 Pogadaev et al. ........... 315/224

FOREIGN PATENT DOCUMENTS

| JP | 06 349586 A | 12/1994 |
| JP | 06 310287 A | 3/1995 |
| WO | WO 01/6998 A1 | 9/2001 |

* cited by examiner

Primary Examiner—Tuyet Thi Vo
(74) Attorney, Agent, or Firm—Larry Liberchuk

(57) ABSTRACT

A switch mode power supply for igniting and operating a high-pressure gas discharge lamp includes an ignition sub-circuit which is coupled via a transformer to the circuit. The ignition sub-circuit has at least an ignition capacitor, and a switching element for discharging the capacitor at a desired moment in time having a control electrode. The control electrode of the switching element is connected to the commutator of the lamp circuit via a control sub-circuit having substantially passive elements.

10 Claims, 2 Drawing Sheets

SWITCH MODE POWER SUPPLY FOR A GAS DISCHARGE LAMP

This application claims priority to International Application No. PCT/IB02/02102 published on Jun. 5, 2002.

BACKGROUND OF THE INVENTION

The present invention relates to a switch mode power supply for igniting and operating a high-pressure gas discharge lamp, wherein the switch mode power supply is provided with an ignition sub-circuit for generating voltage pulses for igniting the lamp.

WO-0 169 985 discloses a lamp operating circuit of a known type, comprising an ignition circuit which comprises a switch and a pulse capacitor which is connected via an ohmic resistor to a buffer capacitor, wherein pulses for igniting the lamp can be generated at a frequency of at least 100 Hz. A drawback of this known switch mode power supply is that the pulse generation is uncoordinated, independently of the current available for the lamp, so the chance of ignition is relatively small. As a result a certain quantity of wolfram evaporates from the electrodes during startup of the lamp, whereby the light output of the lamp deteriorates and the lifespan thereof is shortened. In addition, a separate control unit is required which is complex and comprises a large number of components.

OBJECTS AND SUMMARY OF THE INVENTION

The present invention attempts to obviate the above stated problems, and provides for this purpose a switch mode power supply for igniting and operating a high-pressure gas discharge lamp, having a lamp circuit and comprising an ignition sub-circuit, which is coupled via a transformer to the lamp circuit, wherein the ignition sub-circuit comprises:

at least an ignition capacitor;

a switching element for discharging the capacitor at a desired moment in time having a control electrode;

wherein the control electrode of the switching element is connected to the commutator of the lamp circuit via a control sub-circuit which comprises substantially passive elements.

Such a switch mode power supply comprises a simple ignition circuit with a smaller number of components. A better ignition in cold state is also obtained, whereby the light output of the lamp is improved and the lifespan extended.

In a further preferred embodiment the switching element is a so-called TRIAC. Such a switching element is generally available on the market and is simple to control.

In a further preferred embodiment the capacitor and the switching element are coupled via the primary winding of the transformer to the lamp circuit and form therewith a resonant circuit such that the current through the ignition sub-circuit generates a voltage pulse of a desired level over the secondary winding of the transformer.

In a further preferred embodiment the switch mode power supply comprises at least one buffer capacitor for storing a voltage, and the ignition sub-circuit comprises at least one resistor which is connected on one side to the buffer capacitor and on the other side to the at least one capacitor of the ignition sub-circuit. The energy for the voltage pulses is thus drawn directly from the buffer capacitor so that fewer components are required and the switch mode power supply becomes more compact.

In a further preferred embodiment the switch mode power supply comprises a so-called Half Bridge Commutating Forward circuit, so that the switch mode power supply becomes more compact and fewer components are required.

In a further preferred embodiment the switch mode power supply comprises at least one DIAC, for instance with a breakover voltage of 30 V, for making the switch element conductive at a predetermined moment.

In a further preferred embodiment the switch mode power supply comprises a SIDAC so that the switch element does not remain conductive after the at least one capacitor has been discharged.

According to a further aspect, the present invention provides a method for igniting and operating a high-pressure gas discharge lamp, by means of a switch mode power supply having a lamp circuit, comprising of arranging an ignition sub-circuit, wherein the ignition sub-circuit comprises:

at least an ignition capacitor;

a switching element for discharging the capacitor at a desired moment in time having a control electrode;

wherein the control electrode of the switching element is connected to a commutator of the lamp circuit via a control sub-circuit which comprises substantially passive elements.

With such a method the ignition probability is increased, so that fewer ignition pulses are needed to ignite the lamp. The light output of the lamp is thereby improved and the lifespan extended.

In a preferred embodiment the switching element is a TRIAC. Such a switching element is generally obtainable commercially and is simple to control.

Further advantages and features of the present invention will be elucidated with reference to the annexed figures, in which:

DESCRIPTION OF THE PREFERRED EMBODIMENTS

Figure 1:
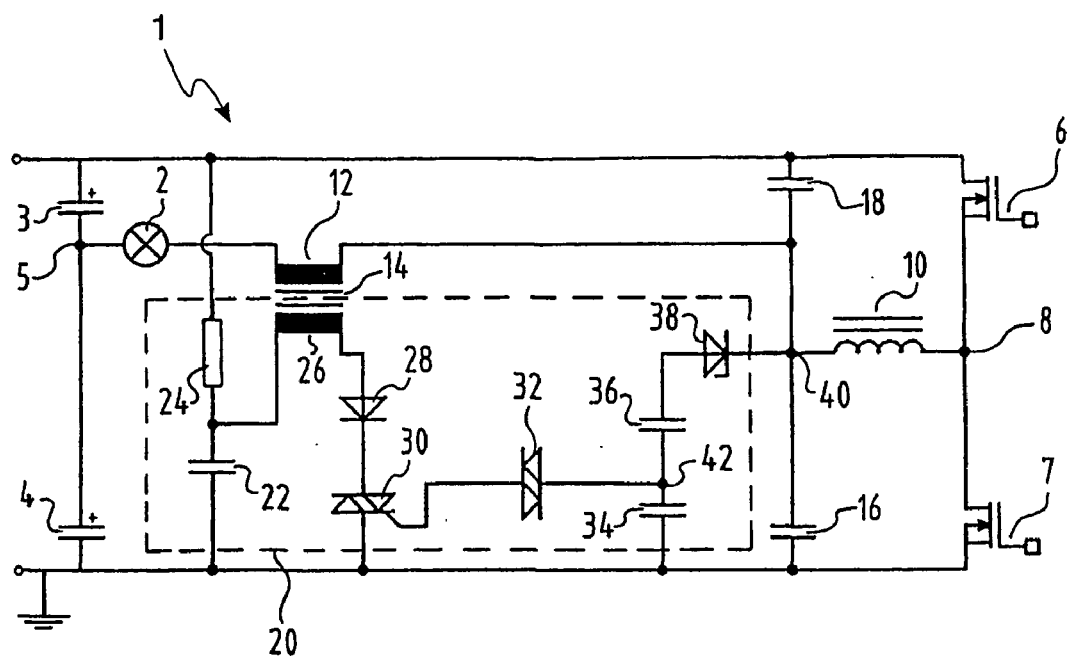
FIG. 1 shows a circuit diagram of a switch mode power supply according to the present invention in a first preferred embodiment.

A first preferred embodiment of a switch mode power supply according to the present invention (FIG. 1) comprises a so-called Half Bridge Commutating Forward (HBCF) as a lamp-circuit 1 for controlling a gas discharge lamp 2, for instance a metal halogenide lamp with a power of 35–70 W. The HBCF circuit 1 comprises the capacitors 3 and 4, which have the function of buffer capacitor and voltage divider, so that point 5 of the circuit carries half the rail voltage or Open Circuit Voltage (OCV), for instance 200 V, and the FETs 6 and 7. The FETs 6 and 7 are made conducting and non-conducting in a commutating fashion at a predetermined frequency such that point 8 of the circuit carries the Open Circuit Voltage, for instance 400 V, or 0 V. Coil 10 is present to provide a stabilized current to the series of lamp 2 and the secondary winding 12 of transformer 14. The secondary winding 12 filters in co-action with capacitors 16 and 18 the varying component of the load current provided by coil 10.

The ignition sub-circuit 20 is coupled to the HBCF circuit 1 by the transformer 14 and comprises a ignition or pulse capacitor 22 which is connected to the rail voltage on buffer capacitor 3 via the ohmic resistor 24. Ignition capacitor 22 can have a very low impedance, so it is capable of withstanding the high dV/dt that is needed in ignition circuits. Ignition capacitor 22 forms part of an electrical resonant circuit for generating voltage pulses for the purpose of igniting lamp 2, with a voltage of about 3.5–5 kV, wherein the primary winding 26 of transformer 14 is likewise included in the circuit together with diode 28 and as the switching element switch 30, for instance a TRIAC. Switch 30 has a control electrode and is controlled by a control sub-circuit comprising DIAC 32 with capacitors 34, 36 and the Zener diode 38, so that no further control logic is required. So the control sub-circuit comprises substantially passive elements. The control electrode of the switch 30 thus is connected to the commutator of the lamp circuit via the control sub-circuit.

In order to ignite the lamp 2 the ignition or pulse capacitor 22 is charged via the ohmic resistor 24, wherein switch 30 is in opened non-conducting state. If switch 30 is closed by a small current from DIAC 32, the resonant circuit is then closed so that the ignition capacitor discharges via coil 26, diode 28 and switch 30. The current through coil 26 generates via the transformer 14 a high voltage pulse over coil 12 which is also applied to the lamp 2. This process is repeated until the lamp is ignited.

The moment at which the ignition pulse takes place is of great importance here, since ignition probability is the greatest just after the moment of commutation. That is the moment at which the FETs 6 and 7 change from conducting state to non-conducting state, or vice versa. Switch 30 is controlled for this purpose by DIAC 32, with a breakover voltage of about 30 V. The use of a DIAC has the advantage of a low cost price. The capacitive divider formed by capacitors 34 and 36, which produces no additional losses such as would occur in the case of a resistive divider, has such a value that the DIAC is triggered if the voltage swing on point 40 equals the OCV. This circuit is improved by adding a zener diode 38, with a breakover voltage of about 200 V, to avoid false triggering of the DIAC, for instance in the case of asymmetric buffer capacitor voltage distribution during lamp starting.

Figure 2:
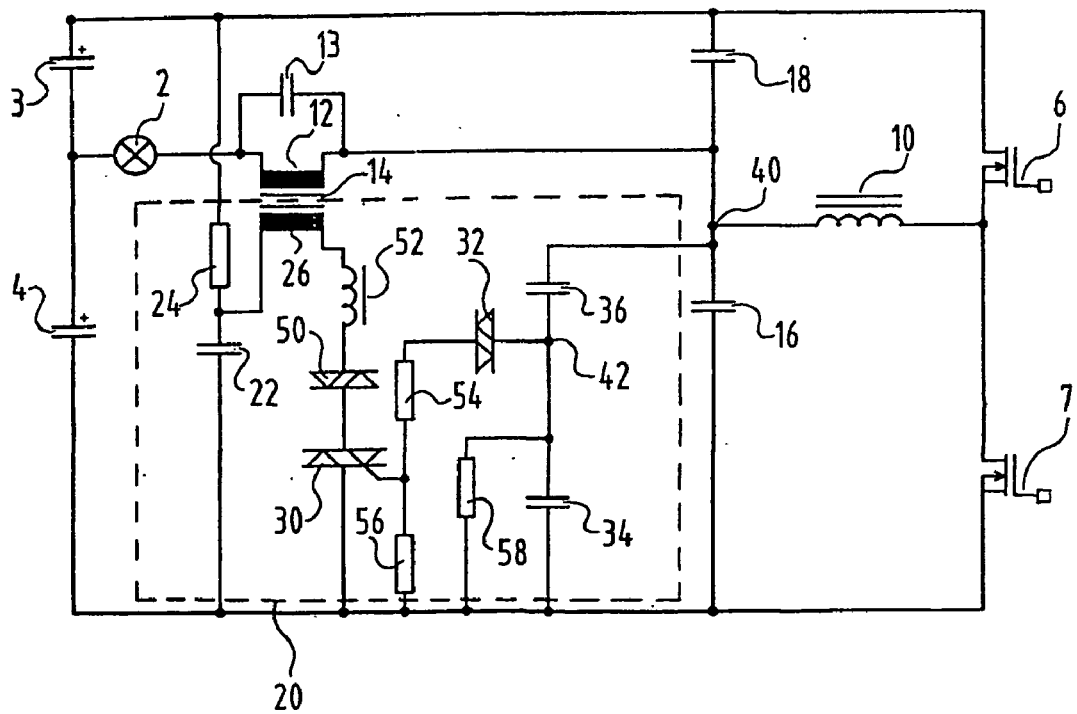
FIG. 2 shows a circuit diagram of a switch mode power supply according to the present invention in a second preferred embodiment.

A second preferred embodiment (FIG. 2) is an improved version of the first preferred embodiment, wherein false triggering is even better prevented. In the embodiment of FIG. 1 the switch 30 can, after discharging of the ignition capacitor 22, remain continuously conductive due to the current running via resistor 24, which is for instance caused by a false triggering of switch 30. Ignition capacitor 22 is then not charged for a new ignition pulse. This is prevented by adding semiconductor element 50, for instance a SIDAC with a breakover voltage of 120 V and a minimal current a few times greater than the minimal current necessary for the switch 30 to remain in conducting state. By applying semiconductor element 50 the recombination time available for the charge carriers in (the semiconductor material of) switch 30 is herein extended, for instance until ignition capacitor 22 has once again been charged to 120 V.

Several resistors 54, 56 and 58 are further arranged. The ohmic resistor 54 of for instance 47 Ω serves to limit the current on the gate of switch 30, resistor 56 of for instance 10 kΩ is arranged to reduce the susceptibility to failure of the gate of switch 30, and resistor 58 of for instance 1 MΩ serves to reduce possible overshoot of the voltage on the capacitive divider so as to prevent false triggering of switch 30.

Multiple samples of a practical embodiment of the second preferred embodiment (FIG. 2) have been tested for 4000 hours with the use of components of production quality, wherein no problems were diagnosed. In a practical realization, the described second preferred embodiment is suitable for igniting and operating 35 W and 70 W metal halogenide lamps, which are marketed by applicant as type CDM. Buffer capacitors 3, 4 then have for instance a value of 68 μF, the ignition capacitor 22 has a value of for instance 33 nF and the resistor 24 is for instance 47 kΩ. In operating state the voltage over the buffer capacitors has a value in the order of 480 V.

Figure 3A:
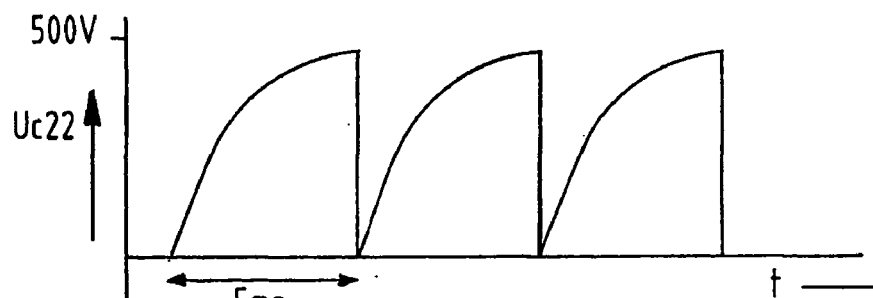
FIGS. 3A to 3C show graphs of the voltage progression in time at respective points in the switch mode power supply of FIG. 2.
Figure 3B:
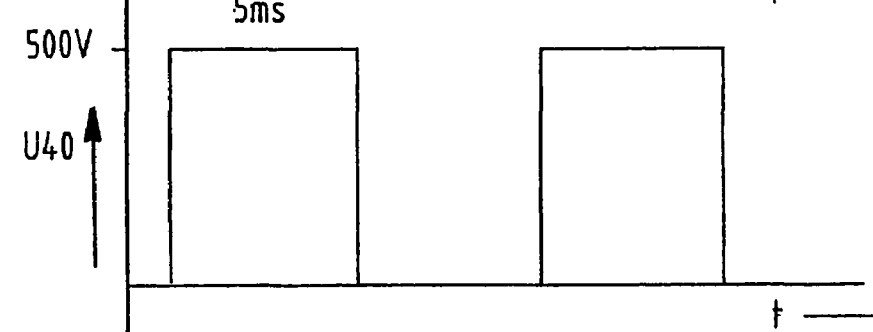
Figure 3C:
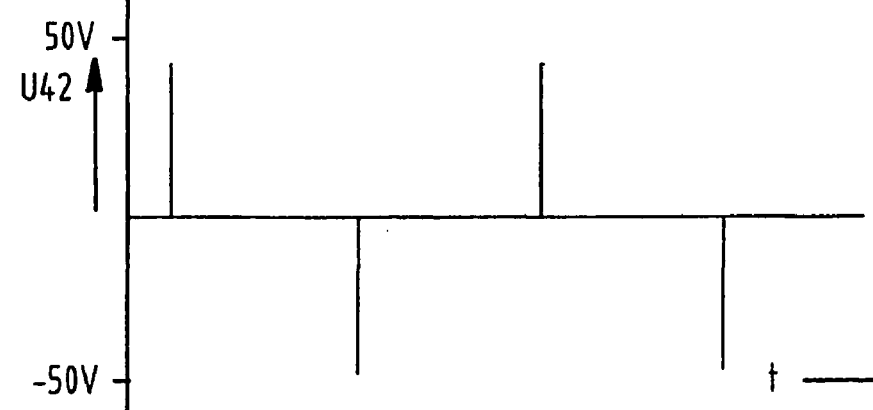

FIG. 3A shows the time progression of the voltage over ignition capacitor 22 Uc22, wherein t is the time and one period is about 5 ms. The voltage increases from 0 V to a maximum value in the order of 480 V. Just after the moment of commutation the capacitor is discharged so that the voltage thereover decreases to about 0 V. FIG. 3B shows the voltage U40 on point 40 of circuit 1, wherein the voltage thereon is alternately about 0 V and about 480 V. This voltage controls the voltage U42 on point 42 of the circuit 1, wherein each time the voltage on point 40 varies a voltage is applied at point 42. Capacitors 34 and 36 have for instance values in the order of 10 nF and 1.2 nF, so that the voltage on point 42 has the time progression as shown in FIG. 3C with a peak value of about 40 V. At this value the DIAC 32, with a breakover voltage of about 30 V, transposes into conducting state so that switch 30 opens the resonant circuit and ignition capacitor 22 discharges and a voltage pulse occurs over lamp 2.

The protection sought for the present invention is not limited to the above described preferred embodiments thereof, in which many modifications can be envisaged; this protection is defined by the appended claims.

What is claimed is:

1. Switch mode power supply for igniting and operating a high-pressure gas discharge lamp, having a lamp circuit and comprising an ignition sub-circuit, which is coupled via a transformer to the lamp circuit, wherein the ignition sub-circuit comprises:
   at least an ignition capacitor;
   a switching element for discharging the capacitor at a desired moment in time having control electrode;
   wherein the control electrode of the switching element is connected to a commutator of the lamp circuit via a control sub-circuit which comprises substantially passive elements.

2. Switch mode power supply for igniting and operating a high-pressure gas discharge lamp as claimed in claim 1, wherein the switching element is a so-called TRIAC.

3. Switch mode power supply for igniting and operating a high-pressure gas discharge lamp as claimed in claim 1, wherein the ignition capacitor and the switching element are coupled via the primary winding of the transformer to the lamp circuit and form a resonant circuit therewith.

4. Switch mode power supply for igniting and operating a high-pressure gas discharge lamp as claimed in claim 1, wherein the switch mode power supply comprises a so-called Half Bridge Commutating Forward circuit.

5. Switch mode power supply as claimed in claim 1, wherein the control sub-circuit comprises at least one DIAC, for instance with a breakover voltage of 30V.

6. Switch mode power supply as claimed in claim 1, wherein the ignition sub-circuit also comprises a SIDAC so that the switching element does not remain conductive after the ignition capacitor has been discharged.

7. Switch mode power supply as claimed in claim 1, wherein the control sub-circuit comprises at least one resistor for distributing a voltage.

8. Switch mode power supply for igniting and operating a high-pressure gas discharge lamp, said switch mode power supply having a lamp circuit and comprising an ignition sub-circuit, which is coupled via a transformer to the lamp circuit, wherein the ignition sub-circuit comprises:
- at least an ignition capacitor;
- a switching element for discharging the capacitor at a desired moment in time having control electrode;
- wherein the control electrode of the switching element is connected to a commutator of the lamp circuit via a control sub-circuit which comprises substantially passive elements; and
- wherein the switch mode power supply comprises at least one buffer capacitor for storing a voltage and wherein the ignition sub-circuit comprises at least one resistor which is connected on one side to the buffer capacitor and on the other side to the ignition capacitor of the ignition sub-circuit.

9. Switch mode power supply having a lamp circuit and comprising an ignition sub-circuit, which is coupled via a transformer to the lamp circuit, wherein the ignition sub-circuit comprises:
- at least an ignition capacitor;
- a switching element for discharging the capacitor at a desired moment in time having control electrode; and
- at least two capacitors which are connected as a capacitive divider to the DIAC;
- wherein the control electrode of the switching element is connected to a commutator of the lamp circuit via a control sub-circuit which comprises substantially passive elements.

10. Switch mode power supply having a lamp circuit and comprising an ignition sub-circuit, which is coupled via a transformer to the lamp circuit, wherein the ignition sub-circuit comprises:
- at least an ignition capacitor;
- a switching element for discharging the capacitor at a desired moment in time having control electrode; and
- a Zener diode for triggering the DIAC at a desired voltage;
- wherein the control electrode of the switching element is connected to a commutator of the lamp circuit via a control sub-circuit which comprises substantially passive elements.

* * * * *